United States Patent
Indovino et al.

(10) Patent No.: US 12,390,674 B2
(45) Date of Patent: Aug. 19, 2025

(54) RELEASE VALVE FOR FIRE PROTECTION SYSTEMS, FIRE PROTECTION SYSTEM AND RELATIVE ACTIVATION METHOD

(71) Applicants: Gianluca Indovino, Rome (IT); Stefano Binotti, Rome (IT)

(72) Inventors: Gianluca Indovino, Rome (IT); Stefano Binotti, Rome (IT)

( * ) Notice: Subject to any disclaimer, the term of this patent is extended or adjusted under 35 U.S.C. 154(b) by 302 days.

(21) Appl. No.: 18/030,073

(22) PCT Filed: Sep. 21, 2021

(86) PCT No.: PCT/IT2021/050288
§ 371 (c)(1),
(2) Date: Apr. 4, 2023

(87) PCT Pub. No.: WO2022/074690
PCT Pub. Date: Apr. 14, 2022

(65) Prior Publication Data
US 2023/0356016 A1   Nov. 9, 2023

(30) Foreign Application Priority Data
Oct. 5, 2020   (IT) .................. 102020000023368

(51) Int. Cl.
*A62C 35/68* (2006.01)
*A62C 99/00* (2010.01)
*F16K 15/03* (2006.01)

(52) U.S. Cl.
CPC .......... *A62C 35/68* (2013.01); *A62C 99/0018* (2013.01); *F16K 15/038* (2013.01)

(58) Field of Classification Search
CPC .... A62C 35/68; A62C 99/0018; F16K 15/038
(Continued)

(56) References Cited

U.S. PATENT DOCUMENTS 2,580,365 A * 12/1951 Simmonds ................ F02K 9/58
137/71
2,742,094 A *  4/1956 Mathisen ............. A62C 13/003
169/9

(Continued)

FOREIGN PATENT DOCUMENTS

| EP | 1302710 A2 | 4/2003 |
| EP | 3460300 A1 | 3/2019 |
| WO | 8803824 A1 | 6/1988 |

OTHER PUBLICATIONS

Standard for Clean Agent Fire Extinguishing Systems—NFPA 2001. The National Fire 20 Protection Association (NFPA) for the United States, standard UNI EN 15004.

(Continued)

*Primary Examiner* — Chee-Chong Lee
(74) *Attorney, Agent, or Firm* — SOROKER AGMON NORDMAN RIBA

(57) ABSTRACT

This invention relates to a release valve (100) for fire protection systems, consisting of a tubular body (1) with a first end and a second end, and which comprises: coupling means with an extinguishing gas source at a first pressure, arranged at said first end; an outlet (12), arranged at said second end; a pressurisation inlet (11), arranged in a position between said coupling means and said outlet (12) and able to be connected to pressurising means at a second pressure, greater than said first pressure; a rupture disc (2), arranged in a position between said pressurisation inlet (11) and said outlet (12) and configured to open at said second pressure; and a non-return device (3), arranged in a position between said coupling means and said pressurisation inlet (11), said non-return device (3) being configured to allow a passage of fluid in the direction from said coupling means towards said pressurisation inlet (11) and prevent a passage of fluid in the direction from said pressurisation inlet (11) towards said coupling means.

(Continued)

The invention also relates to a fire protection system comprising an extinguishing gas source connected to a release valve (100) for fire protection systems of the above type and a method for activating said system.

10 Claims, 1 Drawing Sheet

(58) Field of Classification Search
USPC .................................................. 169/46
See application file for complete search history.

(56) References Cited

U.S. PATENT DOCUMENTS

| | | | | |
|---|---|---|---|---|
| 2,766,832 | A | * 10/1956 | Mathisen | ............... A62C 35/08 |
| | | | | 89/1.14 |
| 3,092,286 | A | * 6/1963 | Duff | ........................ F16K 13/06 |
| | | | | 137/68.13 |
| 3,604,511 | A | * 9/1971 | Griffith | .................. A62C 35/08 |
| | | | | 220/89.4 |
| 3,722,734 | A | * 3/1973 | Raidl, Jr. | ............. F16K 17/1606 |
| | | | | 137/910 |
| 4,046,156 | A | 9/1977 | Cook | |
| 4,126,184 | A | 11/1978 | Hinrichs | |
| 4,838,356 | A | * 6/1989 | Akatsu | ................... A62C 37/50 |
| | | | | 73/863.86 |
| 4,986,366 | A | * 1/1991 | O'Connell | ......... A62C 99/0018 |
| | | | | 137/68.13 |
| 6,006,842 | A | 12/1999 | Stilwell et al. | |
| 7,281,544 | B2 | 10/2007 | Bocquart | |

OTHER PUBLICATIONS

"Fixed firefighting systems—Gas extinguishing systems" valid for Italy and based, together with other national standards, on ISO 14520 "Gaseous Fire-Extinguishing Systems".

* cited by examiner

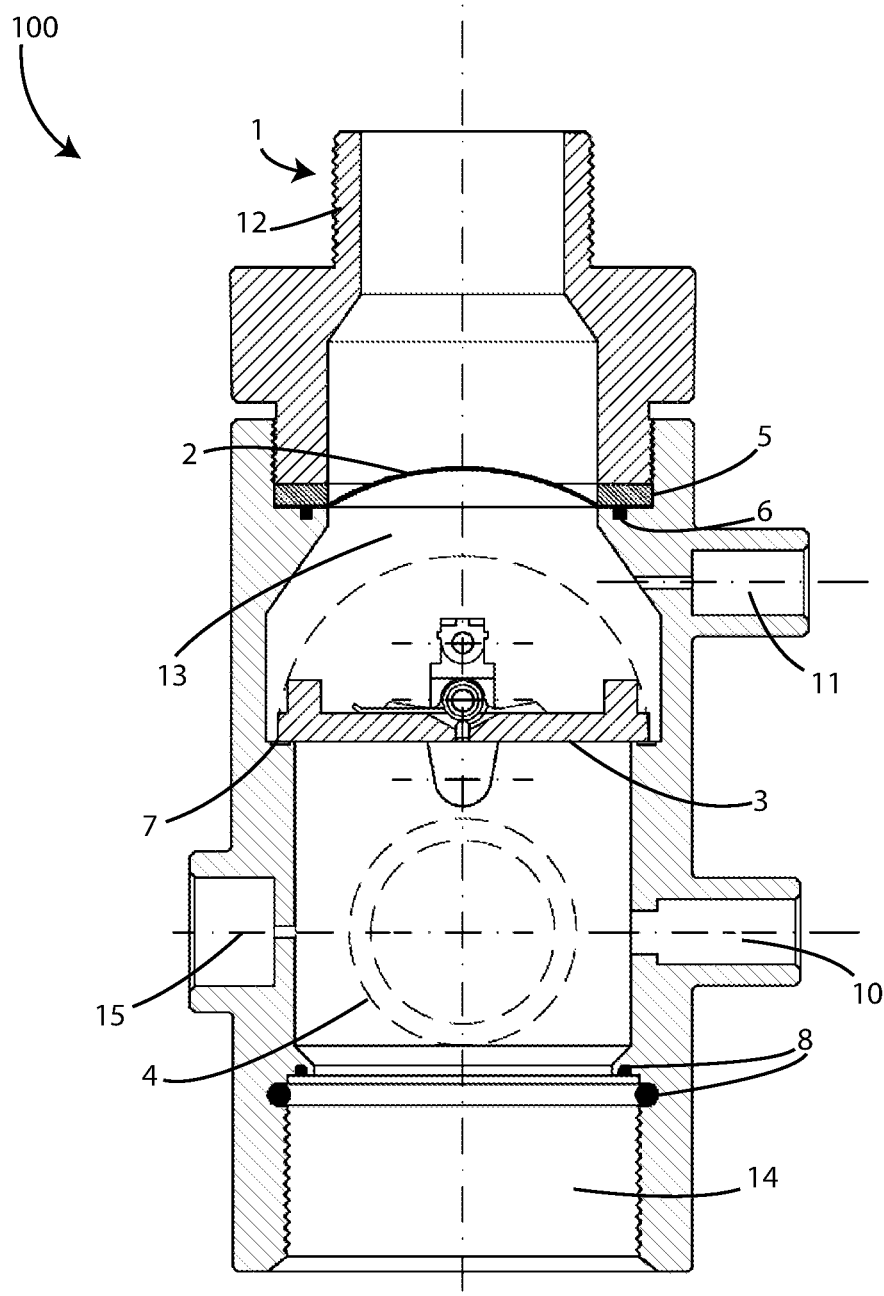

RELEASE VALVE FOR FIRE PROTECTION SYSTEMS, FIRE PROTECTION SYSTEM AND RELATIVE ACTIVATION METHOD

This invention relates to a release valve for fire protection systems, a fire protection system and a relative activation method.

More precisely, this invention relates to a pressure-activated extinguishing gas release valve for the release of fire extinguishing gases of a gas fire protection system.

This invention also relates to a fire protection system comprising said valve.

As is known, gas systems, also known as "clean agent" systems, are among the systems for active fire protection. These systems use inert gases or gas extinguishing chemical substances to saturate the environment into which they are released and put out the fire. Inert gases extinguish the fire by reducing the concentration of oxygen in the environment, gas extinguishing chemical substances through more complex mechanisms, including the development of endothermic reactions. Said inert gases and said gas extinguishing chemical substances will also be identified as a whole later in this description as extinguishing gases.

Extinguishing gas fire protection systems were first used over a century ago when the first carbon tetrachloride fire protection system was invented. However, the greatest developments took place only in the years immediately following the Second World War, when "Halon" gases (for example bromochlorodifluoromethane) were introduced, and in the early 1990s with the introduction of its substitutes having a lower environmental impact which in part are still present on the market.

The inert gases most used today in gas fire protection systems are argon (Ar), nitrogen ($N_2$), singly or in a mixture, which are both normally present in the atmosphere and have a low environmental impact. The gas extinguishing chemical substances most used in fire protection systems on the other hand are HFC-227ea or 1,1,1,2,3,3,3-heptafluoropropane, HFC-125 or pentafluoroethane and FK 5-1-12 or perfluoro (2-methyl-3-pentanone).

Gas systems can be advantageously used on objects and/or machinery of different types, including electronic and live ones, without damaging them irreparably and in areas normally manned by personnel, unlike what is foreseen for systems that use water, foam, powder. Furthermore, gas systems guarantee the total saturation of the environments into which these gases are released, also known as "total flooding", allowing the formation of a homogeneous concentration of extinguishing agent in the room of interest in a very short time, usually within 10 seconds from the release.

Said feature makes it possible to quickly extinguish fires present in the most hidden and less accessible areas of the environments in question.

The characteristics and advantages of gas fire protection systems have favoured their widespread diffusion, especially in areas where the value of the protected capital is significant and where it is necessary to guarantee the safety of personnel, and in particular in the case of personnel assigned to supervise the protected environment even during the fire.

Gas fire protection systems must also follow specific safety regulations, such as the technical standard "*Standard for Clean Agent Fire Extinguishing Systems—NFPA 2001*" drawn up by the National Fire Protection Association (NFPA) for the United States, standard UNI EN 15004 "Fixed firefighting systems—Gas extinguishing systems" valid for Italy and based, together with other national standards, on ISO 14520 "*Gaseous Fire-Extinguishing Systems*", which define the reference standard.

In fire protection systems of the known art, valves operated at differential pressure are often used for the release of the extinguishing agent, which in turn are connected to the neck of the cylinder containing the extinguishing gas. These valves are often referred to as "shut-off valves" or "release valves".

The activation of these valves involves the displacement of one of their pistons and therefore the flow of the extinguishing agent (in the form of a compressed liquid) through the discharge outlet of the valve itself. The activation is usually of the manual or automatic kind and can take place mechanically, pneumatically or electrically by means of a solenoid valve. An example of such systems is described in European Patent No. EP 1 302 710 B1.

In the valves according to the background art, there is often also a small rupture disc which performs the function of safety device to prevent the fire protection system from exploding or being damaged due to an increase in the pressure difference between the cylinder and the outside environment, especially if caused in a relatively short period of time. Said safety device releases the extinguishing agent into the external environment.

It is well known that the efficiency of a valve is directly correlated to the "head loss" that the fluid undergoes, whether in the gaseous, liquid or mixed phase (fluid in biphasic conditions), during the crossing of the valve itself. The head loss, often also incorrectly referred to as "pressure loss", is equivalent to the total loss of energy possessed by the fluid as it crosses the device.

The head loss for a given fluid in a given phase depends on the characteristics of the valve in terms of the tortuosity of the free passages (paths travelled by the fluid) and on the shape of the parts of the valve itself in contact with the fluid. In other words, the most efficient valves, that is to say, those which induce less energy loss of the fluid when they are being crossed, are those that allow a sufficiently regular path for the fluid, with limited, abrupt changes of direction and narrowings and with rounded internal shapes.

In a fire protection system, a lower head loss of the release valve translates into a series of advantages that directly and indirectly reflect on the efficiency and cost-effectiveness of the entire system. The diameter of the release valve, cylinder capacity, operating pressure and the type of extinguishing agent being equal, by virtue of the greater energy possessed by the fluid downstream of the valve, a system equipped with a release valve with reduced or limited head loss indeed allows improving the transfer of the fluid from the cylinder to the nozzles and therefore to the environment to be protected, with the possibility of covering greater distances and therefore of placing the cylinders in more remote points than the place to be protected, or transferring a greater quantity of fluid per unit of time. The possibility of placing the cylinders in remote places with respect to the risk to be protected in particular could be useful, when not essential, in awkward and/or inaccessible places and/or with small spaces available for positioning the cylinders near the environment to be protected, and in any case to the advantage of greater system installation flexibility.

Furthermore, a release valve with reduced head loss allows—for the same energy considerations—reducing the quantity and pressure of the pressurisation gas (propellant, generally nitrogen) necessary for the correct operation of the system. The pressurisation gas in fact consists of an accumulation of potential energy which moves the extinguishing gas during the discharge. A reduced quantity of propellant has the double advantage of freeing up space in the cylinder for the extinguishing agent, which translates into the possibility of using a smaller and therefore less expensive cylinder (greater extinguishing mass/propellant mass ratio), that is, by virtue of the lower operating pressure, of reducing the thickness of the cylinder itself, with a further reduction in cost.

Furthermore, the valves according to the known art generally have considerable constructive complexity, with extensive use of mechanical parts and with significant weights; said constructive complexity normally does not allow making devices with a sufficient nominal diameter to be installed on cylinders having dimensions greater than 350 litres of capacity. By way of example, cylinders with a maximum capacity of 343 litres are currently on the market, coupled to valves with a nominal diameter of 3" (88.9 mm). These 3" valves have a weight of 18.82 kg (without considering the activation devices), a length of 241 mm and a diameter of 129 mm. This limit sometimes imposes system configurations consisting of numerous cylinders in parallel.

The provision of a valve according to the known art with a diameter equal to or greater than 5" would involve insurmountable technical difficulties and in any case, prohibitive weights and dimensions.

In the prior art, other examples of valves for fire protection systems are described in EP 3 460 300 A1, U.S. Pat. No. 4,046,156 A1, U.S. Pat. No. 7,281,544 B2, WO 8 803 824 A1.

In particular, EP 3 460 300 A1 describes a valve for releasing pressurised fluids; said valve is activated by opening a rupture disc, in turn operated by a mechanical device which regulates its opening without piercing the disc.

U.S. Pat. No. 4,046,156 A1 on the other hand describes a valve for releasing extinguishing gases comprising a rupture disc which opens following the explosion of an explosive charge arranged inside the system and adapted to generate a shock wave capable of causing the rupture of said rupture disc.

U.S. Pat. No. 7,281,544 B2 describes a valve for releasing extinguishing gases comprising a rupture disc made of ceramic material activated by electrical controls.

WO 8 803 824 A1 describes a valve for releasing fire extinguishing agents connected to a pressurised container into which the extinguishing agent to be released is present and comprising a diaphragm obtained in a limited area of the wall of the same container, which is fragmented at the occurrence of the pressure difference generated by a pressure generator. In particular, said pressure generator comprises a gas generator for supplying the overpressure necessary to rupture the diaphragm.

However, each of the solutions proposed in the known art has significant operating limitations.

The valve described in EP 3 460 300 A1 is formed by a rupture disc of the reverse acting kind, the opening of which is caused by an external device for the destabilisation of the dome. In particular, said destabilisation is induced by means of a strut (with alternatively electric, pneumatic or squib drive) which, by hitting the top of the dome when needed, destabilises it causing the disc to rupture. Although of undoubted effectiveness, said solution is rather complicated, expensive and subject to potential malfunctions. Furthermore, the valve described in EP 3 460 300 A1 does not integrate the non-return valve, which must necessarily be present, as required by the technical standards of the sector. Therefore, the valve described in patent EP 3 460 300 A1 needs to be coupled to a check valve, which, being an additional element, contributes to the increased cost of the device and adds an additional element to the hydraulic circuit, which obstructs the free surface for the passage of the fluid, with effects on the total head losses.

The valve described in U.S. Pat. No. 4,046,156 A1 presents problems of reliability, effectiveness and repeatability of the actuation system by providing the explosion of an explosive charge near the rupture disc. The overpressure induced by the explosive charge does not occur in a confined environment, as the upper part of the device is completely open and at atmospheric pressure and therefore does not guarantee the opening of the disc. In fact, it is well known that rupture discs open due to overpressure, reverse acting ones also due to the destabilisation of the dome, but never due to a shock wave, unless they generate shock waves of significant intensity which is not compatible with that to which a common fire protection system could resist. The device described in U.S. Pat. No. 4,046,156 moreover requires the presence of an upper protection grid, placed in order to prevent the disc fragments from clogging the pipes downstream. Said grid is an obstacle to the free passage of the extinguishing fluid, thus generating a significant head loss.

The valve described in U.S. Pat. No. 7,281,544 B2 also has problems of reliability, effectiveness and repeatability of the actuation system, which provides using an electric discharge for the purpose of rupturing a ceramic diaphragm. Furthermore, a ceramic diaphragm would not be compatible with the operating pressures at which modern gas fire protection systems are used (up to 70 bar nominal pressure), unless it includes very thick diaphragms, which would require significant electrical impulses for the their possible rupture. Additionally, the fragmentation of a ceramic diaphragm can clog the pipes downstream, making the system completely ineffective. Finally, to operate an electric discharge directly on the diaphragm, it must be isolated from the rest of the valve/cylinder system, with solutions that are not mentioned in U.S. Pat. No. 7,281,544 B2, also to avoid the risk of electrocution of the operators during the maintenance operations, in case of an accidental activation of the system.

The device described in WO 8 803 824 A1 is an opening mechanism integrated with the container wherein the extinguishing agent is contained. In any case, said solution can be used for the fire protection of volumes of the order of a few cubic meters, but it is not suitable for environments of dimensions such as those normally to be protected in common practice, which have volumes of up to hundreds of cubic meters.

The aim of this invention is therefore to overcome the drawbacks of the prior art.

Moreover, an aim of this invention is to provide a gas release valve for fire protection systems which is more efficient than valves according to the background art and which minimises the head losses of the extinguishing fluid crossing it.

A further aim of this invention is that said valve be economical, when compared to the valves of the prior art.

Moreover, an aim of this invention is to provide a gas release valve which is simple, safe and reliable, both in terms of production and of operation.

Again, an aim of this invention is that said valve guarantees the release of a greater quantity of extinguishing gases, within the discharge time of 10 seconds prescribed by the technical standards, compared to a valve according to the background art having the same diameter.

Finally, the aim of this invention is that these release valves are also able to protect the system from the possible return of the extinguishing gas.

Therefore, a first specific object of this invention is a release valve for fire protection systems, consisting of a tubular body with a first end and a second end and which comprises: coupling means with an extinguishing gas source at a first pressure, arranged at said first end; an outlet, arranged at said second end; a pressurisation inlet, arranged in a position between said coupling means and said outlet and able to be connected to pressurising means at a second pressure, greater than said first pressure; a rupture disc, arranged in a position between said pressurisation inlet and said outlet and configured to open at said second pressure; and a non-return device, arranged in a position between said coupling means and said pressurisation inlet, said non-return device being configured to allow a passage of fluid in the direction from said coupling means towards said pressurisation inlet and prevent a passage of fluid in the direction from said pressurisation inlet towards said coupling means.

Preferably, according to the invention, said tubular body comprises a filling inlet arranged in a position between said coupling means and said non-return device to allow the filling of a cylinder on which said release valve for fire protection systems has been applied.

More preferably, again according to the invention, said tubular body comprises a housing, arranged in a position between said coupling means and said non-return device, for housing a safety disc, calibrated at a lower explosion pressure than said, second pressure and greater than said first pressure, to preserve the release valve for fire protection systems in case of possible accidental overpressures which may occur in the extinguishing gas source.

Furthermore, again according to the invention, said tubular body comprises a manometer, arranged in a position between said coupling means and said non-return device.

Preferably, according to this invention, said, rupture disc is of the non-fragmentable kind, and/or it is pre-engraved and/or it is of the forward acting kind.

A specific object of this invention is also a fire protection system comprising an extinguishing gas source connected to a release valve for fire protection systems as defined above, by means of said coupling means of said release valve for fire protection systems, and pressurising means connected to said release valve for fire protection systems by means of said pressurisation inlet of said release valve for fire protection systems, said pressurising means being configured to transmit, to said release valve for fire protection systems, a pressure which is greater than or equal to the opening pressure of said rupture disc.

Preferably, according to the invention, said fire protection system comprises a circuit for a fire protection system, connected to a release valve for fire protection systems as defined above, by means of said outlet of said release valve for fire protection systems.

In particular, again according to the invention, if said extinguishing gas source is a cylinder, said release valve for fire protection systems comprises a filling inlet arranged in a position between said coupling means and said non-return device, to allow the filling, of said cylinder.

Finally, a method for activating a fire protection system as defined above is a third specific object of this invention, wherein said pressurising means are activated to transmit, to said release valve for fire protection systems, a pressure greater than or equal to the opening pressure of said rupture disc, thus generating the rupture of said rupture disc and allowing the flow of extinguishing gas through said release valve for fire protection systems, from said extinguishing gas source towards said outlet of the release valve for fire protection systems.

The invention is now described, by way of example and without limiting the scope of the invention, with particular reference to accompanying FIG. 1, wherein a release valve for fire protection systems according to this invention is shown.

Referring in particular to FIG. 1, a release valve 100 for releasing extinguishing gas, according to an exemplary embodiment of this invention, comprises:

a tubular body 1 comprising:

a filling inlet 10, for the entry into the release valve 100 of extinguishing gas and propellant, at a first pressure, wherein said filling inlet is for example, able to be connected to a respective outlet of a filling source of extinguishing gas, for example a cylinder or system containing such extinguishing gas at said first pressure;

a pressurisation inlet 11, for the access of pressurising means, at a second pressure higher than said first pressure, for the activation pressurisation of the release valve 100;

an outlet 12, for the outlet of the extinguishing gas from said release valve 100, wherein said outlet may be connected to a downstream hydraulic system, such as the pipes of a fire protection system;

coupling means, for coupling the tubular body 1 with a source of said extinguishing gas, for example a cylinder of gas extinguishing chemical substances pressurised with nitrogen, in particular a threaded portion 14 which can be screwed onto said cylinder;

a rupture disc 2, arranged downstream of said filling inlet 10 and of said pressurisation inlet 11 and upstream of said outlet 12;

a non-return device 3, arranged downstream of said filling inlet 10 and upstream of said pressurisation inlet 11 and of said outlet 12; and a rupture chamber 13, arranged between said rupture disc 2 and said non-return device 3, and comprising said pressurisation inlet 11, the function of which will be better illustrated below.

Furthermore, the release valve 100 shown in FIG. 1 comprises:

a manometer 4, arranged on the tubular body 1 and communicating with the inside of it, located approximately at the height of said filling inlet 10, for measuring said first pressure; and a housing 15, arranged approximately at the height of said filling inlet 10, for housing a calibrated safety disc (not shown), the function of which will be better illustrated below.

In particular, said rupture disc 2 is configured to open at said second pressure, preferably being a rupture disc 2 of the pre-engraved forward acting and non-fragmentable kind, as better illustrated below.

Said non-return device 3, delimiting said rupture chamber 13 at the bottom, is configured to prevent the possible return of the extinguishing gas into the cylinder, as well as to prevent the return of said pressurising means towards the lower part of the release valve 100, seat of said filling inlet 10, of said housing 15 of a safety disc and of said manometer 4, as well as through said coupling means, by way of example consisting of the threaded portion 14, into the cylinder. In particular, the non-return device 3, illustrated by way of example in FIG. 1, is of the kind with a dual wafer disc (also called a "dual striking disc"); however, said device may be of the "clapet" kind, or of another kind in any case adapted to ensure that its free passage for the fluid is equal to or greater than the free surface for the passage for the same fluid of the said rupture disc 2, when open.

The purpose of the calibrated safety disc (not shown) for which the housing 15 is arranged in the tubular body 1 is to protect the release valve 100 from accidental activation due to the occurrence of any unwanted overpressure and it is calibrated at a lower rupture pressure than the opening pressure of the rupture disc 2. In this way, any accidental overpressure occurring in the extinguishing gas cylinder (for example, due to accidental overheating of the same cylinder) would cause the safety disc to rupture instead of the rupture disc 2, thus preventing the accidental activation of the fire protection system.

In the embodiment shown by way of example with reference to FIG. 1, said manometer 4, arranged on the tubular body 1 and communicating with the inside of it, is located approximately at the height of said filling inlet 10, to measure said first pressure. However, other positions of said manometer 4 are possible, provided they communicate with the inside of said tubular body 1 upstream of the non-return device 3. Moreover, preferably, said manometer 4 is generally an analogue manometer, equipped with a pressure transducer (also called "manometer-pressure switch").

Finally, the release valve 100 comprises sealing means 5, 6, 7, 8 to ensure the sealing of the elements arranged inside it. In particular, the release valve 100 shown in FIG. 1 comprises a counter-stop ring 5, made of steel, brass or other similar material, immediately upstream of which to install said rupture disc 2, an O-ring 6, for the watertight coupling of the sealing disc 5 with the tubular body 1, an abutment element 7, made alternatively of the same material as the tubular body 1 after grinding or of material which is polymeric in nature, abutting with said non-return device 3 so as to ensure its sealing abutment, and the lower sealing O-rings 8, to ensure the sealing of the gas cylinder when screwed onto said threaded portion 14.

In alternative embodiments (not shown), the coupling means may be different from those shown in FIG. 1, being able to alternatively consist of, for example a bolted coupling flange or of an externally threaded portion, of the male kind, coupled to the cylinder, in place of the threaded portion 14, of the female kind. Similarly, the sealing means may be different from the sealing means 5, 6, 7, 8 described with reference to FIG. 1, but in any case shaped in such a way as to perform the sealing functions described above. In particular, if said coupling means between a cylinder and the release valve for fire protection systems according to this invention is made through bolted flanging, the O-rings 8 will be replaced by a gasket placed between the flanges themselves.

The operation of the release valve 100 is described below.

As already mentioned, the rupture disc 2 is configured to open at said second pressure, with a maximum tolerance of 20% of the nominal opening pressure. In particular, said second pressure is preferably between 25 bar ($2.5 \times 10^6$ Pa) and 300 bar ($3 \times 10^7$ Pa), it being chosen according to the type of system to which the release valve 100 is applied.

The rupture disc 2 must also be of the non-fragmentable kind to prevent the rupture fragments from obstructing the pipes of the system with which said release valve 100 is associated. In particular, as already mentioned, the rupture disc 2 is preferably a rupture disc of the forward acting kind (i.e. with the concavity facing upstream) and is pre-engraved since, in addition to allowing tolerances of the nominal rupturing pressure contained within the limit indicated above, it opens "like petals", allowing a greater free "passage" for the fluid.

Alternatively, the rupture disc 2 can also be a reverse acting or even flat rupture disc, provided that it is always of the non-fragmentable kind, since it fulfils the function to which it is assigned, namely that of limiting the rupture chamber from above and to open instantly at a predetermined nominal pressure.

Preferably, said rupture disc has a diameter of between 2.5 cm and 20 cm, depending on the size of the tubular body 1 of the release valve 100. Smaller diameters are used in valves having smaller nominal diameter and vice versa. The rupture chamber 13 preferably has a volume between 10 cm$^3$ and 3,500 cm$^3$. Said dimensions have been specifically determined, since they guarantee the correct actuation of the release valve for fire protection systems according to this invention, and the possibility of making release valves for fire protection systems also having considerable nominal diameters.

During the activation of the release valve 100, the rupture chamber 13 is in fact hit by said pressurising means, which enter by means of said pressurisation inlet 11, and lead to the achievement of said second pressure, and therefore to the opening of the rupture disc 2.

An example of pressurising means that can be used in the release valve 100 are a gas or, for valves having smaller nominal diameter, a pyrotechnic charge arranged in said rupture chamber 13. Preferably, said pressurising means are inert gases, in the conditions of use, such as for example nitrogen or carbon dioxide, which are non-flammable, have a limited cost and which, remaining in the gaseous state at temperatures in the range of 0° C. to 50° C., can be contained in high pressure and low volume cylinders.

The non-return device 3, in the configuration indicated in FIG. 1 (dual striking disc), substantially consists of two fins hinged along an axis perpendicular to the one of the tubular body 1, equipped with a double spring which holds them in the position indicated in FIG. 1; however, by overcoming the modest effort exerted by said spring, the fins may open according to the dashed line, also shown in FIG. 1. The sealing abutment 7 prevents the fins from opening in the opposite direction.

By virtue of its configuration, the non-return device 3 allows the fluid to pass exclusively from upstream to downstream (therefore, with reference to FIG. 1, from the bottom to the top). Consequently, as soon as the said pressurising means are introduced through the said access inlet 11, the same means cannot freely flow upstream of the non-return device 3, remaining trapped in the said rupture chamber 13, it being delimited, in addition to laterally by the valve body 1, by the rupture disc 2 from above. Consequently, the pressure in the rupture chamber 13 increases almost instantaneously, up to the opening pressure of the rupture disc 2. At this point, a sudden head loss is created in the rupture chamber 13 due to the flow of the pressurising means through the space previously obstructed by said rupture disc 2 and the surface downstream thereof being at atmospheric pressure.

In this situation, due to the pressure gradient that is created between upstream and downstream, the pressurised extinguishing gas flows freely and instantaneously from the cylinder to the release valve 100, through said coupling means, shown in FIG. 1 by way of example by the threaded portion 14; said extinguishing fluid crosses the non-return device 3, which as illustrated above, allows the fluid to pass only from upstream to downstream, crosses the rupture disc 2, previously opened as described above, to then reach said outlet 12. The operation indicated is almost identical in the case of a non-return device of another kind (for example of the "clapet" kind).

Some illustrative, but non-limiting, examples of release valves 100 according to this invention are now described.

EXAMPLE 1

A prototype of the release valve 100 was made, wherein the tubular body 1 has a diameter of 3½" (8.89 cm, female thread) at said threaded portion 14, and equal to 2½" (6.35 cm, male thread) at said outlet 12 and wherein the rupture chamber 13 has a volume equal to approximately 310 cm$^3$.

The rupture disc 2, having a diameter equal to 2½" (6.35 cm), inserted in the tubular body 1, is of the forward acting, pre-engraved, non-fragmentable kind, made of stainless steel, with a nominal rupture pressure of 60 bar ($6 \times 10^6$ Pa) and tolerance ±6 bar. The threaded portion 14 was screwed to an extinguishing gas cylinder having a capacity equal to 150 litres and equipped with a suction tube.

The assembly, consisting of the cylinder and the release valve 100, was loaded, through said filling inlet 10, with 120 kg of FK 5-1-12 extinguishing agent, pressurised with nitrogen $N_2$ until said first pressure was reached, which in the case in the example is equal to 35 bar ($3.5 \times 10^6$ Pa) at 21° C.

The pressurisation inlet 11, arranged at the height of said rupture chamber 13, was connected to a high pressure pipe equipped with a ball check valve, in turn connected, by means of a valve that can be opened on command, to a 3 litre nitrogen cylinder, pressurised at 100 bar.

The outlet 12 was connected to a pipe with an internal diameter of 2½ (6.35 cm) and a length of 10 m, which simulates the path of the pipes in a fire protection system.

A safety disc calibrated to a rupture pressure equal to 47 bar (±3 bar tolerance) was installed at the housing 15.

Finally, a pressure transducer connected to a data acquisition system was installed—communicating with the inside of the valve body 1—at the height of the rupture chamber 13.

Once the valve of the 3 litre nitrogen cylinder is opened, said nitrogen is drained through said pressurisation inlet 11 into the rupture chamber 13, almost instantly bringing the pressure inside said rupture chamber 13 to a second pressure equal to 58 bar ($5.8 \times 10^6$ Pa), a value at which the rupture disc 2 opened, with consequent immediate inflow of the extinguishing agent into the specially prepared drain pipe. The pressure of the nitrogen applied in the rupture chamber 13 was therefore sufficient to open the rupture disc 2, thus activating the release valve 100.

EXAMPLE 2

A prototype of the release valve 100 was made, wherein the tubular body 1 has a diameter of 3½" (8.89 cm, female thread) at said threaded portion 14, and equal to 2½" (6.35 cm, male thread) at said outlet 12 and wherein the rupture chamber 13 has a volume equal to approximately 310 cm$^3$.

The rupture disc 2, having a diameter equal to 2½" (6.35 cm), inserted in the tubular body 1, is of the reverse acting, pre-engraved, non-fragmentable kind, made of stainless steel, with a nominal rupture pressure of 60 bar ($6 \times 10^6$ Pa) (tolerance ±6 bar). The threaded portion 14 was screwed to an extinguishing gas cylinder having a capacity equal to 150 litres and equipped with a suction tube.

The assembly, consisting of the cylinder and the release valve 100, was loaded, through said filling inlet 10, with 120 kg of HFC-227ea extinguishing agent, pressurised with nitrogen $N_2$ until said first pressure was reached, which in the case in the example is equal to 35 bar ($3.5 \times 10^6$ Pa) at 21° C.

The pressurisation inlet 11, arranged at the height of said rupture chamber 13, was connected to a high pressure pipe equipped with a ball check valve, in turn connected, by means of a valve that can be opened on command, to a 3 litre carbon dioxide cylinder, pressurised at 100 bar.

The outlet 12 was connected to a pipe with an internal diameter of 2½ (6.35 cm) and a length of 10 m, which simulates the path of the pipes in a fire protection system.

A safety disc calibrated to a rupture pressure equal to 47 bar (±3 bar tolerance) was installed at the housing 15.

Finally, a pressure transducer connected to a data acquisition system was installed—communicating with the inside of the valve body 1—at the height of the rupture chamber 13.

Once the valve of the 3 litre carbon dioxide cylinder is opened, said carbon dioxide is drained through said pressurisation inlet 11 into the rupture chamber 13, almost instantly bringing the pressure inside said rupture chamber 13 to a second pressure equal to 64 bar ($6.4 \times 10^6$ Pa), a value at which the rupture disc 2 opened, with consequent immediate inflow of the extinguishing agent into the specially prepared drain pipe. Also in this second example, the pressure of the carbon dioxide applied in the rupture chamber 13 was therefore sufficient to open the rupture disc 2, thus activating the valve.

In conclusion, the examples indicated above have confirmed that the release valve for fire protection systems of this invention is a device with a significantly reduced head loss compared to the valves of the known art.

Furthermore, the release valve for fire protection systems the object of this invention can be made with a greater diameter than that typical of valves according to the known art. In fact, the constructive and functional simplicity of the release valve for fire protection systems according to this invention is directly reflected not only in its cost, but also in the possibility of making valves with a considerable diameter.

In particular, due to its constructive simplicity and reduced weight, the release valve for fire protection systems according to this invention allows making a device even with a size equal to or greater than 5" (139.7 mm) in nominal diameter, having a smaller weight and overall dimensions than a valve according to the known art with a smaller diameter, which can be used on cylinders having dimensions equal to or greater than 1500 litres.

Therefore, the release valve for fire protection systems according to this invention allows configuring systems with a single large cylinder (for example, one having a capacity of 1,000 litres) instead of numerous medium-sized cylinders (for example, four cylinders with a capacity of 250 litres each), with a significant reduction in the overall cost, weight and overall dimensions of the work.

Although the valve described in this patent is particularly suitable for use in gas systems that use gas extinguishing chemical substances as extinguishing agents, it can be used as a release valve for other classes of extinguishing agents, including by way of example, inert gases, water spray, fire-extinguishing powder, fire-extinguishing foam.

Preferred embodiments and suggested variants of this invention have been described herein, but it is to be understood that experts in the field may make modifications and changes without departing from the scope of protection as defined by the appended claims.

The invention claimed is:
1. Release valve (100) for fire protection systems, consisting of a tubular body (1) with a first end and a second end and which comprises: coupling means with an extinguishing gas source at a first pressure, arranged at said first end; an outlet (12), arranged at said second end; a pressurization inlet (11), arranged in a position between said coupling means and said outlet (12) and able to be connected to pressurizing means at a second pressure, greater than said first pressure; a rupture disc (2), arranged in a position between said pressurization inlet (11) and said outlet (12) and configured to open at said second pressure; and a non-return device (3), arranged in a position between said coupling means and said pressurization inlet (11), said non-return device (3) being configured to allow a passage of fluid in the direction from said coupling means towards said pressurization inlet (11) and prevent a passage of fluid in the direction from said pressurization inlet (11) towards said coupling means; characterized in that tubular body (1) comprises a filling inlet (10) arranged in a position between said coupling means and said non-return device (3).

2. Release valve (100) for fire protection systems according to claim 1, wherein said tubular body (1) comprises a housing (15), arranged in a position between said coupling means and said non-return device (3), for housing a safety disc.

3. Release valve (100) for fire protection systems according to claim 1, wherein said tubular body (1) comprises a manometer (4), arranged in a position between said coupling means and said non-return device (3).

4. Release valve (100) for fire protection systems according to claim 1, wherein said rupture disc (2) is of the non-fragmentable kind.

5. Release valve (100) for fire protection systems according to claim 1, wherein said rupture disc (2) is pre-engraved.

6. Release valve (100) for fire protection systems according to claim 1, wherein said rupture disc (2) is of the forward acting kind.

7. Fire protection system comprising an extinguishing gas source connected to a release valve (100) for fire protection systems, said release valve (100) for fire protection systems consisting of a tubular body (1) with a first end and a second end, and comprising: coupling means with an extinguishing gas source at a first pressure, arranged at said first end; and outlet (12), arranged at said second end; a pressurization inlet (11), arranged in a position between said coupling means and said outlet (12) and able to be connected to pressurizing means at a second pressure, greater than said first pressure; a rupture disc (2), arranged in a position between said pressurization inlet (11) and said outlet (12) and configured to open at said second pressure; and a non-return device (3), arranged in a position between said coupling means and said pressurization inlet (11), said non-return device (3) being configured to allow a passage of fluid in the direction from said coupling means towards said pressurization inlet (11) and prevent a passage of fluid in the direction from said pressurization inlet (11) towards said coupling means, wherein said tubular body (1) comprises a filling inlet (10) arranged in a position between said coupling means and said non-return device (3), wherein said extinguishing gas source is connected to said release valve (100) for fire protection system, by means of said coupling means of said release valve (100) for fire protection systems, and pressurizing means connected to said release valve (100) for fire protection systems by means of said pressurization inlet (11) of said release valve (100) for fire protection systems, said pressurizing means being configured to transmit, to said release valve (100) for fire protection systems, a pressure greater than or equal to the opening pressure of said rupture disc (2).

8. Fire protection system according to claim 7, comprising a circuit for a fire protection system connected to the release valve (100) for fire protection system, by means of said outlet (12) of said release valve (100) for fire protection systems.

9. Fire protection system according to claim 7, wherein said extinguishing gas source is a cylinder.

10. Method for activating a fire protection system, said fire protection system comprising an extinguishing gas source connected to a release valve (100) for fire protection systems, said release valve (100) for fire protection systems consisting of a tubular body (1) with a first end and a second end, and comprising: coupling means with an extinguishing gas source at a first pressure, arranged at said first end; an outlet (12), arranged at said second end; a pressurization inlet (11), arranged in a position between said coupling means and said outlet (12) and able to be connected to pressurizing means at a second pressure, greater than said first pressure; a rupture disc (2), arranged in a position between said pressurization inlet (11) and said outlet (12) and configured to open at said second pressure; and a non-return device (3), arranged in a position between said coupling means and said pressurization inlet (11), said non-return device (3) being configured to allow a passage of fluid in the direction from said coupling means towards said pressurization inlet (11) and prevent a passage of fluid in the direction from said pressurization inlet (11) towards said coupling means, wherein said tubular body (1) comprises a filling inlet (10) arranged in a position between said coupling means and said non-return device (3), wherein said extinguishing gas source is connected to said release valve (100) for fire protection systems by means of said coupling means of said release valve (100) for fire protection systems, and pressurizing means connected to said release valve (100) for fire protection systems by means of said pressurization inlet (11) of said release valve (100) for fire protection systems, said pressurizing means being configured to transmit to said release valve (100) for fire protection system, a pressure greater than or equal to the opening pressure of said rupture disc (2), wherein said pressurizing means are activated to transmit, to said release valve (100) for fire protection systems, a pressure greater than or equal to the opening pressure of said rupture disc (2), thus generating the rupture of said rupture disc (2) and allowing the flow of extinguishing gas through said release valve (100) for fire protection systems, from said extinguishing gas source towards said outlet (12) of the release valve (100) for fire protection systems.

* * * * *